United States Patent [19]

Jorritsma

[11] Patent Number: 5,063,778
[45] Date of Patent: Nov. 12, 1991

[54] APPARATUS FOR MEASURING THE LEVEL OF A LIQUID IN A WETWELL

[76] Inventor: Johannes N. Jorritsma, 37 Yonge Street N., Aurora, Ontario, Canada, L4G 1N6

[21] Appl. No.: 546,746

[22] Filed: Jul. 2, 1990

[51] Int. Cl.$^5$ .................... G01F 23/22; G01F 23/00
[52] U.S. Cl. ................................ 73/299; 73/301; 73/290 R
[58] Field of Search ............. 73/299, 301, 293, 290 R

[56] References Cited

U.S. PATENT DOCUMENTS

| 1,413,235 | 4/1922 | Novick et al. | 73/299 |
| 3,463,015 | 8/1969 | Gulino et al. | 73/299 |
| 3,713,338 | 1/1973 | Kind | 73/299 |
| 4,019,387 | 4/1977 | Siegel | 73/299 |
| 4,355,238 | 10/1982 | Ruell | 73/293 |
| 4,375,764 | 3/1983 | Lawford et al. | 73/299 |
| 4,409,833 | 10/1983 | Thomson et al. | 73/299 |
| 4,722,228 | 2/1988 | Awa et al. | 73/301 |
| 4,954,724 | 9/1990 | Koda et al. | 73/293 |

FOREIGN PATENT DOCUMENTS 0190224 11/1982 Japan ........................ 73/293
0019512 2/1983 Japan ........................ 73/293

Primary Examiner—William A. Cuchlinski, Jr.
Assistant Examiner—Diego F. F. Gutierrez
Attorney, Agent, or Firm—Shoemaker and Mattare, Ltd.

[57] ABSTRACT

A self-contained, submerged apparatus for monitoring the height of a liquid in a wetwell includes a tube defining an upright conduit, a first chamber at the bottom of the conduit and communicating with it, a second chamber adjacent the first chamber and separated from it by a first impervious non-rigid membrane, the second chamber being defined in part by a second impervious non-rigid membrane in contact with the liquid in the wetwell. The second chamber contains a first liquid to which the membranes are inert, and the first chamber contains a second liquid to which the first membrane is inert. Pressure from the liquid in the wetwell exerted against the first membrane is transmitted to the second membrane and causes the second liquid to rise in the tube. The top of the tube is vented to the atmosphere, and a plurality of electrical terminals disposed at spaced locations lengthwise of the tube are provided for producing a signal which is a function of the height of the second liquid in the conduit.

8 Claims, 4 Drawing Sheets

APPARATUS FOR MEASURING THE LEVEL OF A LIQUID IN A WETWELL

This invention relates generally to submerged pressure-detecting apparatus, and is directed particularly to an apparatus of this kind which is useful for controlling a sewage pumping station. Those familiar with the art will recognize that the structure to be disclosed herein is useful for many applications going beyond that of pumping sewage.

BACKGROUND OF THIS INVENTION

It is known to use a purge bubbler to determine the height of a liquid in a wetwell or the like. It is also known to determine the back pressure in a bubbler tube by using an apparatus with a flat plate manometer having vertically stacked level-sensing contacts which are reached by liquid mercury as it rises up the manometer. The rising mercury closes a circuit between a common contact and the various contacts along the vertical column, and the height of the liquid in the container is then determined on the basis of which contact is the highest contact closed by the mercury. U.S. Pat. No. 4,297,081, issued Oct. 27, 1981 to Irvin, is exemplary of this prior art approach.

Two other patents of interest in this area are the following:
U.S. Pat. No. 4,380,933, issued Apr. 26, 1983 to Irvin,
U.S. Pat. No. 3,947,692, issued Mar. 30, 1976 to Payne.

The prior art developments are generally cumbersome methods of determining the height of a liquid in a container or wetwell. Accordingly, it is an object of one aspect of this invention to provide a simplified but reliable, self-contained apparatus which can be immersed in a liquid, and which is adapted to provide a reliable signal representing the height of the liquid in a wet well.

SUMMARY OF THE INVENTION

Accordingly, this invention provides an apparatus for monitoring the height of a liquid in a wet well comprising:
tubular means defining an upstanding conduit,
a first chamber at the bottom of said conduit and communicating therewith,
a second chamber adjacent said first chamber and separated therefrom by a first impervious, non-rigid membrane,
said second chamber being defined in part by a second impervious, non-rigid membrane in contact with the ambience,
said second chamber containing a first liquid to which both membranes are inert,
said first chamber containing a second liquid to which the first membrane is inert, the second liquid being capable of being forced up the conduit under pressure exerted by the ambience through said second and said first membranes,
vent means ensuring that the portion of the conduit above the second liquid remains at atmospheric pressure,
and electronic means for providing a signal which is a function of the height of the second liquid in said conduit.

BRIEF DESCRIPTION OF THE DRAWINGS

Four embodiments of this invention are illustrated in the accompanying drawings, in which like numerals denote like parts throughout the several views, and in which.

DETAILED DESCRIPTION OF THE PREFERRED EMBODIMENTS

Figure 1:
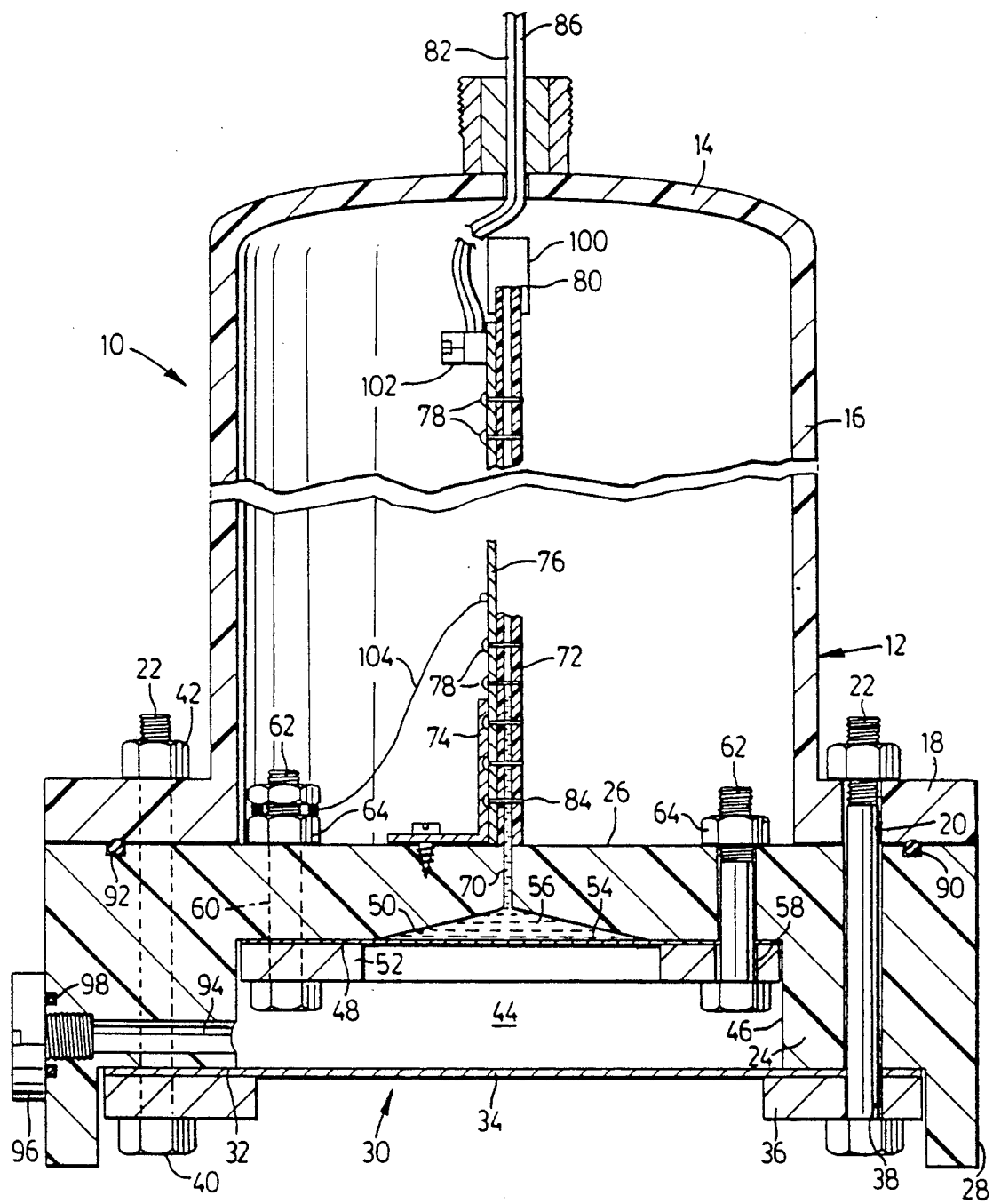
FIG. 1 is a vertical axial sectional view through an apparatus for determining the level of a liquid in a wet well in which the apparatus is immersed, showing one embodiment.

In FIG. 1, an apparatus shown in generally at 10 is seen to include an upper P.V.C. housing 12 which comprises a domed top wall 14, a cylindrical side wall 16, and an annular bottom flange 18.

At intervals around the flange 18 are provided bore holes 20 through which bolts 22 can pass.

Located directly under the housing 12 is P.V.C. base member 24 which has a substantially flat upper surface 26, a cylindrical outer surface 28, and a stepped recess 30. The first portion of the stepped recess 30 is defined by an annular, downwardly-facing surface 32 against which a first circular membrane 34 is pressed by an annular member 36 having a series of bores 38 matching the distribution of the bores 20. Similarly, the base member 24 also has a series of bores distributed in the same manner as the bores 20. As is clear from FIG. 1, the bolts 22 have heads 40 bearing upwardly against the underside of the annular member 36, so that when the various portions are placed together as shown, a nut 42 can be threaded on the top ends of the bolts 22 in order to compress the various portions together. This compression creates a water-tight seal at the contact location between the circular membrane 34 and the surface 32 of the base member 24.

FIG. 1 further shows that the stepped recess 30 includes an inner portion 44 defined by a cylindrical, inwardly facing surface 46, an annular, downwardly-facing surface 48, and a conical, downwardly-facing surface 50. A further annular member 52 fits within the portion 44 of the stepped recess 30, and is adapted to compress the peripheral portion of a further membrane 54 against the annular downwardly-facing surface 48. The diaphragm illustrated in FIG. 1 extends across in a substantially flat plane, which means that it defines, between itself and the conical surface 50, a conical upper chamber 56.

The annular member 52 has a plurality of peripherally spaced bores 58 which are aligned with an equal number of bores 60 in the base member 24, so that further bolts 62 can be passed through the member 52, the membrane 54 and the base member 24, in order to receive nuts 64 to tighten these various portions together.

A small-diameter passageway 70 in the base member 24 communicates the chamber 56 with the upper surface 26 of the base member 24. Juxtaposed firmly against the upper surface 26 is a length of plastic tubing 72, arranged so that its internal lumen is continuous with the passageway 70. The plastic tubing 72 is supported in an upright position with respect to the upper surface 26, by means of a P.C. board support bracket 74, along with a P.C. board 76. The P.C. board 76 supports a plurality of stainless steel terminals 78 which pass hermetically through the side wall of the plastic tubing 72, and can be contacted by a liquid inside the plastic tubing 72. The liquid used in this invention is liquid mercury, which fills the chamber 56.

The top end 80 of the plastic tubing 72 opens to the interior of the housing 12, which interior is in communication with the ambient atmosphere above the liquid (in which the apparatus is immersed) through an air hose 82. Thus, the housing 12 contains atmospheric pressure, and the atmospheric pressure is in contact with the top of the mercury column inside the plastic tubing 72.

It has been found that the portion 44 of the stepped recess 30 (i.e. that lying between the membranes 34 and 54) can be filled with oil, anti-freeze or a mixture of sugar and water.

It will thus be understood that, as hydrostatic pressure increases upwardly against the bottom of the membrane 34, a similar pressure will be transferred by the liquid in the portion 44 to the underside of the membrane 54, thus pushing upwardly on the mercury in the chamber 56, thus in turn forcing the mercury to rise along the plastic tubing 72. More specifically, assuming the apparatus to be located at a stationary position close to the bottom of a wetwell or other container, it will be understood that as the wetwell fills with water or sewage, the hydrostatic pressure on the bottom of the membrane 34 will increase, thus causing the mercury to rise in the plastic tubing 72.

As sequential terminals are contacted by the mercury, a closed circuit is set up between the lowermost terminal 84 and the terminals above it. This information can then be passed out of the apparatus along a cable 86.

The flange 18 is sealed against the base member 24 by the provision of an O-ring 90 located in an annular groove 92.

A side passageway 94 is provided in the base member 24, communicating with the portion 44 of the stepped recess 30. The passage 94 is closed by a threaded member 96, and a small O-ring 98 in a suitable groove provided in the base member 24 ensures that no leakage of water or electric current will occur from the portion 44 of the stepped recess 30.

An air filter 100 is provided at the top of the plastic tubing 72.

A terminal block 102 provides a connection for the cable 86.

A ground fault detect wire 104 is connected between the P.C. board 76 and one of the bolts 62.

With the construction described above, a deterioration in either membrane 34 or 54 can be detected. Deterioration of the lower membrane 34 would produce electrical contact between the bolt 62 and the earth ground. Deterioration of the upper membrane 54 produces a contact with the electronics ground or with the mercury reservoir. Both conditions can be detected and monitored in order to allow preventive maintenance on the unit before mercury can escape into the environment.

The apparatus described herein can be utilized along with calculating and control modalities, in the following manner.

A display can be provided on which the level of the water in the wetwell (or equivalent) can be read. This can be done in an analog or digital manner.

A particular level is selected to start the first pump (on pressure increase) or to stop the second pump (on decrease in pressure), and an appropriate electrical connection can be made to execute this function.

It will be evident that each level (represented by terminals 78) represents a volume in the wetwell. By selecting a uniform distribution of the terminals 78, for example 5 mm, the water level difference in the wetwell can be exactly calculated. The specific weight of mercury is 13.6, and therefore a distance of 5 mm between the terminals produces a height difference of 6.8 cm in the water level. In a 4 meter by 2 meter wetwell, this level difference would represent a volume of 544 liters.

This volume would be added to a totalizer each time the level increases by this distance. What has just been described applies to a wetwell having straight vertical walls, and no other obstructions. For a wetwell having sloping walls or with obstructions which falsify the assumption of equal volumes, a curve of volumes could be programmed into a computing device, to represent the volumes in the wetwell corresponding to the various terminals 78. The totalizer could thus be updated with volumes picked from such a curve.

It is further possible, using suitable electronics, to measure the time elapsing between contact of the mercury with two sequential terminals 78. The electronics can then calculate the inflow rate for each fill section, and this can be displaced.

When the level in the wetwell is lowering due to the pumping action, the pump rate can also be calculated by taking the same volume and dividing it by the time required to go from one contact to the next lower contact (terminals 78).

During the pumping, the pump running time for each pump can be recorded and displayed. By selecting this feature with a switch or jumper wire, the pump with the least pumping time can be selected to be the lead pump.

When a pump has been running for a certain period of time, without the level in the wetwell going down (due to an increase in inflow or a pump failure), a preset time will call in the next pump. In other words, this "next" pump would start on a timer rather than on a level contact.

It is preferred that the membrane 34 be made of rubber or equivalent material which is resistant to aqueous solutions containing various contaminants.

It will be appreciated that the wetwell control system described above does not require a compressor, or a stand-by air supply.

This invention also contemplates the use of alternative means for determining the height of the mercury column in the plastic tubing 72. For example, this height can be detected by optical means. Alternatively, the mercury height in the tube can be detected by capacitance measurement. For the latter, a metal foil could be wrapped around the plastic tubing 72 (which could also be glass), and means (self-evident to the person skilled in the art) could be utilized to detect a change in capacitance of the capacitor defined between the mercury and the foil. In place of wrapping with metal foil, a metal coating could be sprayed directly on the tubing 72. As a further alternative, a wire could be wound around the tubing 72. A further possibility is to provide a metal rod parallel to and adjacent the plastic tubing 72, and detecting the change in capacitance between the mercury and the rod. Some of these possibilities are described below.

Figure 2:
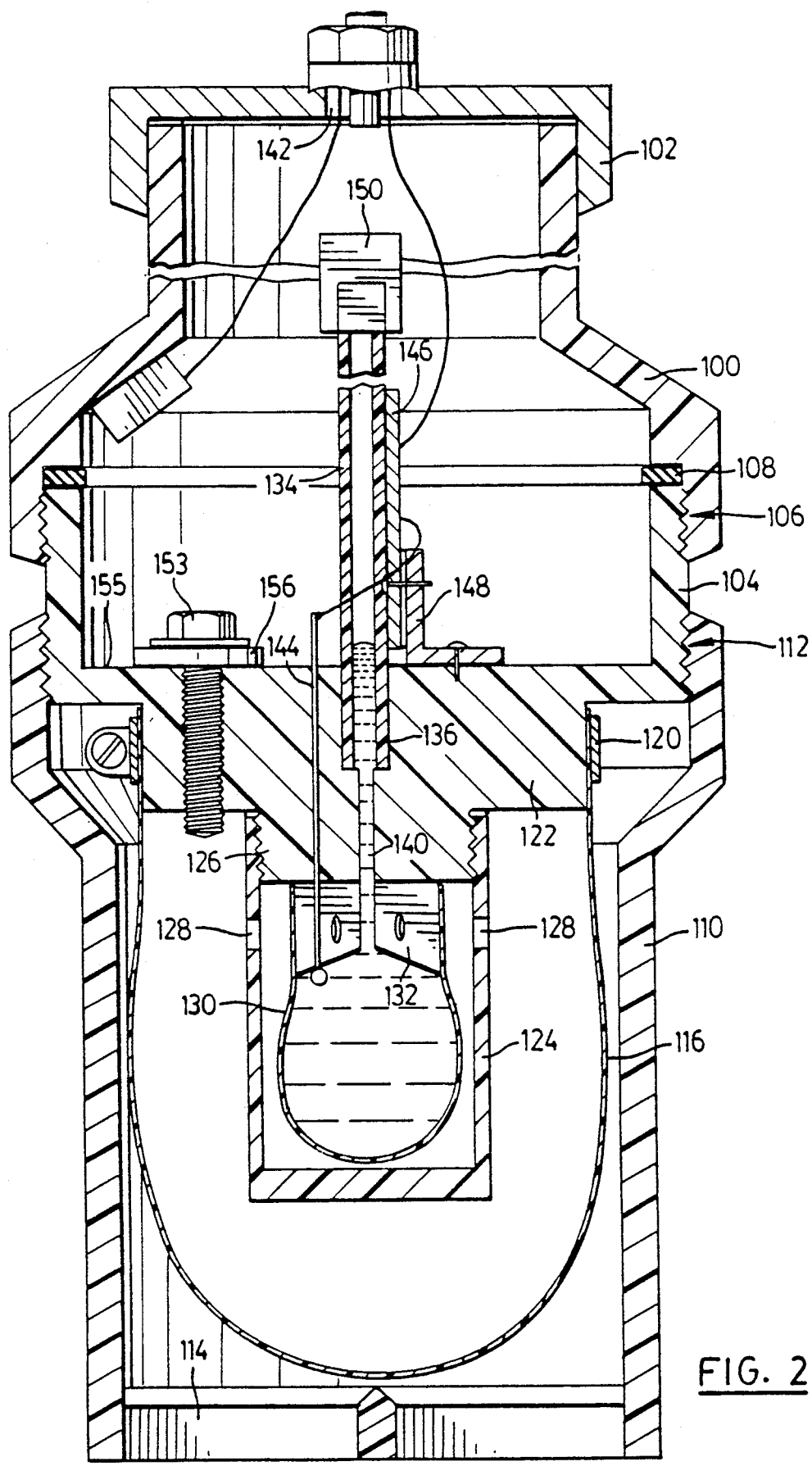
FIG. 2 is a vertical axial sectional view through an apparatus illustrating the second embodiment of this invention.

Attention is now directed to FIG. 2, which shows an alternative construction which includes an upper housing 100 which may be of PVC or ABS, a cap 102 for the housing 100, and a base member 104 which is threadably engaged with the housing 100 at threads 106. and sealed with respect thereto by an annular seal 108. A lower housing 110 is threadably connected to the base member 104 by virtue of a threads 112, and has suitable openings in the bottom 114 to allow water to enter the lower housing 110.

A first flexible bladder 116 is in the shape of a bag or balloon, and is secured in a water-tight manner by an adjustable collar 120 around a boss portion 122 of the base member 104. An internal housing 124 is threadably engaged with a further boss portion 126 of the base member 104, the internal housing 124 having lateral openings 128.

Within the internal housing 124 is a second flexible bladder 130 which is secured in a water-tight manner around a member 132 fastened under the second boss portion 126. The second flexible bladder 130 is filled with mercury in this embodiment, and it can be seen that a tubular member 134, analogous to the tubular member 72 in FIG. 1, projects upwardly into the internal chamber defined by the housing 100, and is lodged in a bore 136 in the base member 104. Within the base member 104, the interior of the tubular member 134 communicates with a reduced bore 140 which extends through the portion 132 and communicates with the interior of the second flexible bladder 130.

As with the first embodiment, the interior of the housing 100 is maintained at atmospheric pressure, by a suitable air hose connecting through the central opening 142 in the cap 102. An electrical connection to the mercury in the second flexible bladder 130 is made along a wire 144 which passes upwardly from the interior of the second flexible bladder 130, through the member 132 and the base member 104. As can be seen, the wire 144 projects into the interior of the housing 100. A PC board 146 is secured to the base member 104 and extends upwardly adjacent the tubular member 134. The function of the PC board is to provide a multiplicity of contacts along the tubular member 134, and the electrical wiring that these require. A PC board support bracket 148 is also illustrated. A filter 150 is located at the top of the tubular member 134, in order to prevent the mercury within the tubular member 134 from escaping, while allowing the interior of the tubular member 134 to be at the same pressure as the interior of the housing 100.

A fill plug 153 is in the form of a lag screw with a bolt-like head, and is threaded into a suitable threaded bore in the base member 104. Between the head of the lag screw 153 and the flat horizontal surface 155 at the top of the base member 104, is a seal 156. The lag screw 153 can be removed so that the first flexible bladder 116 can be filled with antifreeze or the like.

In operation, it will be understood that the unit shown in FIG. 2 will be immersed in sewage or wastewater within a wetwell forming part of a sewage pumping system. The water or liquid sewage has access to the outside of the first flexible bladder 116 through openings in the bottom 114 of the lower housing 110, and exerts pressure against the bladder 116. This pressure is transferred to the antifreeze within the bladder, which in turn transfers the pressure to the second flexible bladder 130. The latter in turn exerts pressure on the mercury which it contains, thus causing mercury to rise into the tubular member 134 to a height which depends upon the height of the sewage or wastewater in the wetwell above the unit. The electrical detection of the height of the mercury within the tubular member is carried out in exactly the same manner as has already been described in connection with FIG. 1.

Figure 3:
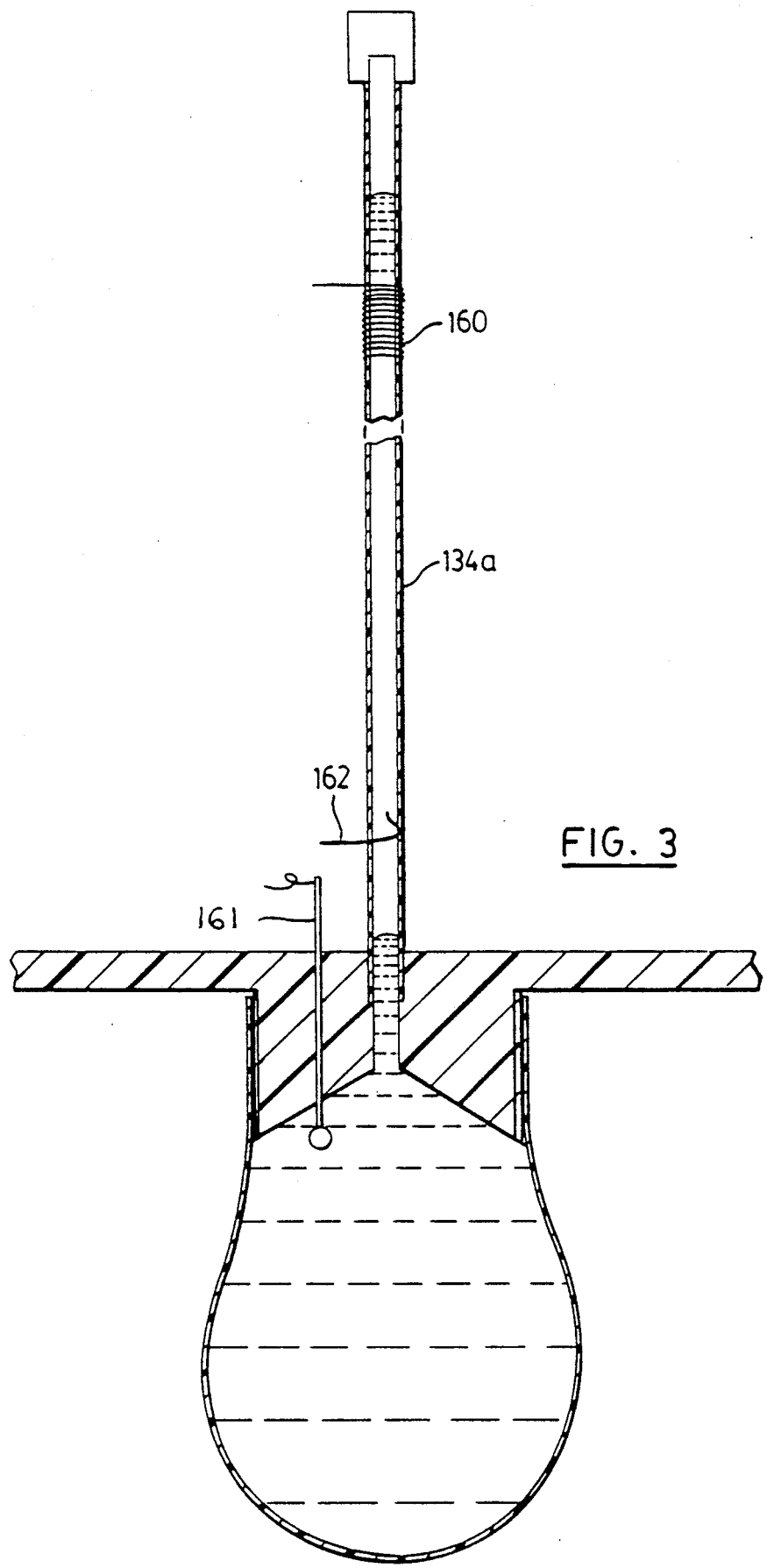
FIG. 3 is a schematic axial sectional view showing the essential part of the third embodiment of this invention.

Attention is now directed to FIG. 3, which is a partial and schematic drawing showing another way of detecting the height of mercury within the tubular member 134a by using capacitance. In the upper portion of FIG. 3, a fine copper wire 160 is coiled around the tubular member 134a. Where mercury lies within the tubular member 134a at a location which is also surrounded by the coiled wire 160, a capacitance will result between the coiled wire and the electrode 161, which is immersed in the mercury. Conventional electronic circuitry is available for determining the degree of capacitance, and for generating a signal in accordance with the measurement of capacitance.

Capacitance can also be generated by providing electrically conductive paint or foil surrounding the tubular member 134a. In the lower portion of FIG. 3, a wire 162 is in contact with such a layer surrounding the tubular member 134a.

The remaining portions of FIG. 3 are the same as the equivalent portions in FIG. 2.

Figure 4:
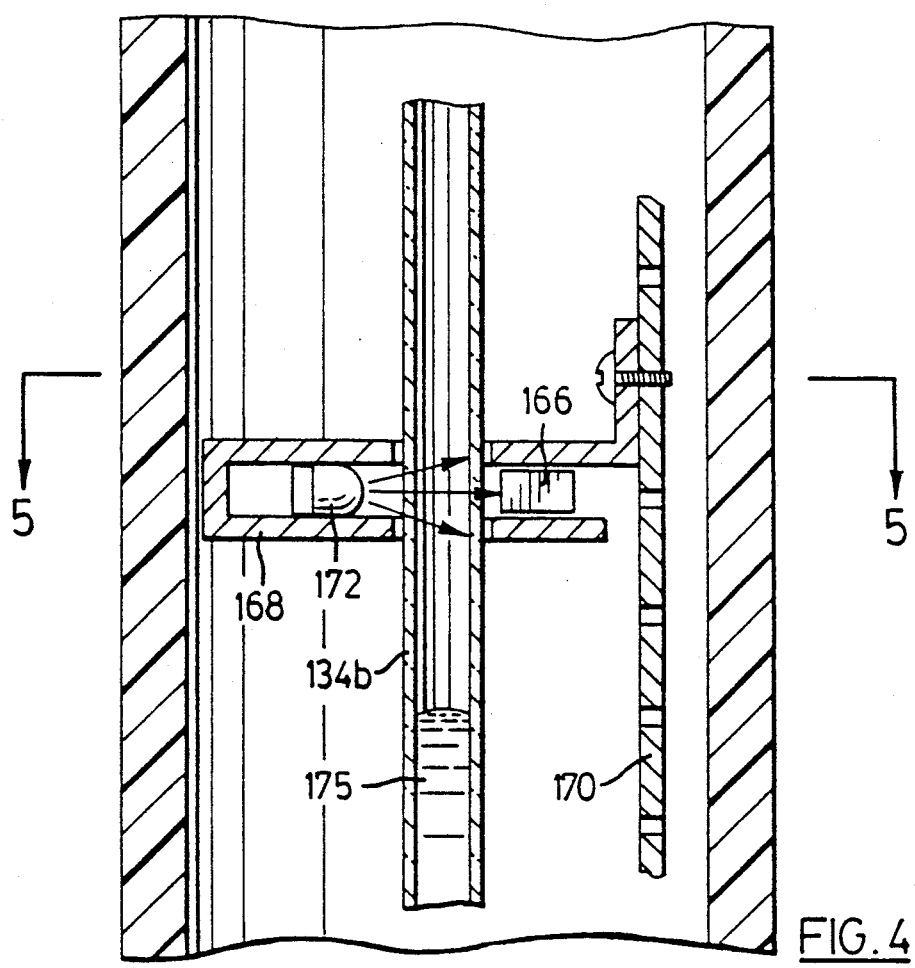
FIG. 4 is a partial axial sectional view of an apparatus illustrating the fourth embodiment of this invention.

FIG. 4 shows a third way of detecting the height of the liquid column in the tubular member 134b. The detection includes a plurality of light-sensitive devices 166, such as a photo-sensitive diode or photocell, shown in FIG. 4 to be mounted on an individual bracket 168, supported from an upstanding mounting board 170. In the embodiment illustrated, photocell 166 is paired with a light source 172, also mounted on the same bracket 168. It will be seen that the light source 172, which may be a light-emitting diode or the like, is directed such that the light which reaches the photocell from the light source 172 must pass through the tubular member 134b. It will be understood that, for this to function properly, the tubular member 134b must be substantially transparent. It will also be understood that, provided the liquid 175 within the tubular member 134b is substantially opaque, its presence at the level of the bracket 168 can be detected by the fact that little or no light from the light source 172 will reach the photocell 166.

Figure 5:
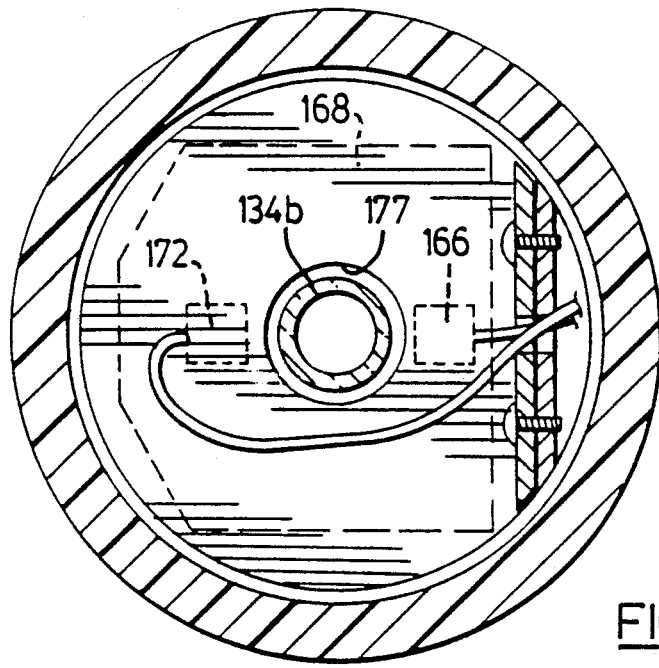
FIG. 5 is a sectional view taken at the line 5—5 in FIG. 4.

The bracket 168 also constitutes a light shield, and in FIG. 5 it will be seen that the bracket 168 has a central bore 177 through which the tubular member 134b passes.

It will be appreciated that a plurality of such brackets 168 would be provided in close spacing longitudinally of the tubular member 134b, and that suitable electric circuitry would be provided to monitor the signals produced by the various photocells 166, in order to determined the height of the liquid 175 within the tubular member 134b, and to read from this height an indication of the height of water or sewage in the wetwell.

While several embodiment of this invention have been illustrated in the drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. An apparatus for measuring the level of a liquid in a wetwell, comprising:

tubular means defining an upstanding conduit, a first chamber at the bottom of said conduit and communicating therewith, a second chamber adjacent said first chamber and separated therefrom by a first impervious, non-rigid membrane, said second chamber being defined in part by a second impervious, non-rigid membrane in contact with the liquid in the wetwell, said second chamber containing a first liquid to which both membranes are inert, said first chamber containing a second liquid to which the first membrane is inert, the second liquid being capable of being forced up the conduit under pressure exerted by the pressure of the liquid in the wetwell through said second and said first membranes, vent means for ensuring that the portion of the conduit above the second liquid remains at atmospheric pressure, and a plurality of electrical terminal provided at spaced locations lengthwise of the tubular means for providing signal which is a function of the height of the second liquid in said conduit, which corresponds to the level of the liquid in the wetwell.

2. The apparatus claimed in claim 1, in which the second liquid is mercury.

3. The apparatus claimed in claim 2, in which the first liquid is an oil.

4. The apparatus claimed in claim 1, in which said first membrane is an unstretched, flexible member.

5. The apparatus claimed in claim 2, in which said plurality of electrical terminals pass through said tubular means in a sealed manner, whereby the said second liquid can make electrical contact with said terminals sequentially as it rises in the conduit, said apparatus further comprising a base terminal in contact with said second liquid below the lowest of said electrical terminals, whereby the base terminal can be put into electrical communication with one or more of said electrical terminals through said second liquid as the second liquid rises, and signal-generating means for generating a signal which varies depending upon which of the contacted electrical terminals is the highest.

6. The apparatus claimed in claim 1, in which both membranes are in the form of flexible bladders.

7. The apparatus claimed in claim 2, wherein the first liquid is antifreeze.

8. The apparatus claimed in claim 2, wherein the first liquid is an aqueous sugar solution.

* * * * *